United States Patent
Peppard et al.

(10) Patent No.: US 7,150,348 B2
(45) Date of Patent: Dec. 19, 2006

(54) ERGONOMIC CLUTCH ACTUATOR

(75) Inventors: Michael B. Peppard, Livonia, MI (US); John Fowler, Livonia, MI (US)

(73) Assignee: Magneti Marelli Powertrain USA LLC, Farmington Hills, MI (US)

( * ) Notice: Subject to any disclaimer, the term of this patent is extended or adjusted under 35 U.S.C. 154(b) by 38 days.

(21) Appl. No.: 10/930,308

(22) Filed: Aug. 31, 2004

(65) Prior Publication Data

US 2005/0072648 A1    Apr. 7, 2005

Related U.S. Application Data (60) Provisional application No. 60/509,376, filed on Oct. 7, 2003.

(51) Int. Cl.
*F16D 23/12* (2006.01)
(52) U.S. Cl. .......................... 192/99 S; 74/518
(58) Field of Classification Search ................ 74/518
See application file for complete search history.

(56) References Cited

U.S. PATENT DOCUMENTS

| | | | |
|---|---|---|---|
| 3,261,438 A * | 7/1966 | Binder ................ | 192/99 S |
| 3,856,123 A | 12/1974 | Kinsey | |
| 4,067,243 A | 1/1978 | Kurata et al. | |
| 4,091,887 A | 5/1978 | Kurata et al. | |
| 4,188,834 A | 2/1980 | Wakatsuki et al. | |
| 4,301,694 A | 11/1981 | Costa | |
| 4,566,577 A | 1/1986 | Tsuboi | |
| 4,599,913 A | 7/1986 | Dawson | |
| 4,624,152 A | 11/1986 | Stotz et al. | |
| 4,637,485 A | 1/1987 | Otteson | |
| 4,817,452 A | 4/1989 | Burkey | |
| 4,878,396 A | 11/1989 | Grunberg | |
| 4,905,536 A | 3/1990 | Nebu et al. | |
| 4,938,092 A | 7/1990 | Nebu et al. | |
| 4,986,403 A | 1/1991 | Tipton | |
| 5,109,968 A | 5/1992 | Pollitt et al. | |
| 5,351,573 A | 10/1994 | Cicotte | |
| 5,413,200 A | 5/1995 | Hirata | |
| 5,477,746 A | 12/1995 | Perisho et al. | |
| 5,528,954 A | 6/1996 | Yoshigai | |
| 5,611,249 A | 3/1997 | Perisho et al. | |
| 5,662,195 A | 9/1997 | Rush | |
| 5,860,892 A | 1/1999 | Korenjak et al. | |
| 5,941,127 A | 8/1999 | Hayd | |

(Continued)

FOREIGN PATENT DOCUMENTS

JP          08232981 A  *  9/1996

(Continued)

*Primary Examiner*—Richard M. Lorence
(74) *Attorney, Agent, or Firm*—Brooks Kushman P.C.

(57) ABSTRACT

The present invention discloses an ergonomic manual clutch actuator assembly, and a method for providing the manual clutch actuator assembly, for a straddle-type vehicle or the like. The assembly includes a manual clutch lever pivotally mounted to a handlebar for drawing a clutch cable connected to a clutch actuator mechanism. The clutch actuator mechanism is provided within the housing of the vehicle for cooperating with a distal end of a clutch shaft for disengaging a clutch when the cable is drawn. The clutch actuator assembly requires a first predefined force to pivot the clutch lever away from a normal extended position. A second predefined force, being greater than the first force, is required to further pivot the clutch lever to an intermediate position. Also, a third predefined force is required to maintain the clutch lever in a retracted position, the third force is less than the second force.

23 Claims, 5 Drawing Sheets

U.S. PATENT DOCUMENTS

| | | |
|---|---|---|
| 5,966,993 A | 10/1999 | Ekins |
| 6,227,342 B1 | 5/2001 | Armbruster et al. |
| 6,263,754 B1 | 7/2001 | Wesling et al. |
| 6,328,147 B1 * | 12/2001 | Fujita ..................... 192/70.23 |
| 6,357,545 B1 | 3/2002 | Hori et al. |
| 6,453,766 B1 | 9/2002 | Ose |
| 2002/0108999 A1 | 8/2002 | Inui et al. |
| 2002/0185355 A1 * | 12/2002 | Drussel et al. ................ 192/83 |
| 2005/0011719 A1 * | 1/2005 | Oishi et al. ............... 192/99 S |

FOREIGN PATENT DOCUMENTS

JP    2002295223 A  * 10/2002

* cited by examiner

ERGONOMIC CLUTCH ACTUATOR

CROSS-REFERENCE TO RELATED APPLICATIONS

This application claims the benefit U.S. provisional application Ser. No. 60/509,376, filed Oct. 7, 2003.

BACKGROUND OF THE INVENTION

1. Field of the Invention

The present invention relates generally to a clutch actuator, more particularly to an ergonomic manual clutch actuator assembly for a motorcycle for reducing operator fatigue.

2. Background Art

Straddle-type vehicles, particularly motorcycles, include a motor for imparting power to a transmission for driving the vehicle. Typically, the motor is an internal combustion engine and the transmission has a plurality of gear reduction ratios for offering a variety of operable modes to a user. In order to shift between gear reduction ratios of the transmission, a clutch is typically utilized between the motor or engine and the transmission. The clutch may be actuated by an actuator that may receive a signal from the user or from an engine control unit, signaling to engage or disengage the clutch.

Alternatively, and more commonly, the clutch is actuated by a manually imparted force through a manual clutch lever, which is pivotally mounted to a handlebar of the motorcycle adjacent to a hand grip on the handlebar. Due to varying demographics within the market of straddle-type vehicle consumers, it is desired to allow the user to manually operate the clutch to provide the user with enjoyment of controlling the operation of the vehicle. This clutch operation typically requires that the user grip the clutch lever and actuate it to a retracted position, relatively close to the handlebar grip, to thereby actuate the clutch to a disengaged position. After a desired gear reduction ratio is selected of the transmission, the user releases its grip upon the manual clutch lever and the clutch reengages.

Conventional clutches, particularly on straddle-type vehicles such as motorcycles, include a friction type clutch that is normally biased to the engaged mode by a clutch spring. The operation of the manual clutch lever draws a clutch cable which is connected to a clutch shaft and the drawn clutch cable actuates the clutch shaft to a disengaged position of the clutch. Accordingly, when the user releases its grip, the clutch spring biases the clutch shaft back to the engaged position of the clutch.

The prior art teaches various clutch actuators for actuating the clutch shaft to the disengaged position upon being drawn by the clutch cable. For example, in straddle-type vehicles that have a high torque output, a correspondingly high force of friction is required to maintain the engagement of a clutch. This high force of friction is generated through mating clutch plates having a high coefficient of friction and large contact area, and a relatively heavy duty clutch spring that has a relatively high spring coefficient for imparting the necessary load. Accordingly, a large manual force is required to actuate the clutch shaft. The force required to displace the clutch shaft increases with the increasing displacement of the clutch shaft due to the increasing relative compression or extension of the clutch spring. Accordingly, in order to maintain the clutch in a disengaged position, a generally increasing force is required having a peak at the disengaged position. In other words, if the user desires to keep the clutch disengaged, the user must maintain the clutch lever in the retracted position corresponding with the highest requirement of manually imparted force.

It is desirable among straddle-type vehicle consumers, particularly motorcycle users, to keep the clutch disengaged when temporarily stopped during use. For example, if a motorcyclist stops at a stop sign or a stop light, the user prefers to keep the clutch disengaged so that the user may shift the motorcycle to the appropriate gear. The alternative of leaving the clutch engaged at a stop would require shifting the transmission into neutral. The preferred method of keeping the clutch disengaged and the transmission in the appropriate gear allows the user to enjoy a quick start or acceleration from the stop position. This option offers benefits both in safety and in user enjoyment. The drawback to this option, however, is the user must maintain the clutch lever in the fully retracted position, which also corresponds with the maximum manual imparted force. As time and repetitions increase, the hand of the operator experiences fatigue which may be undesirable.

Referring again to straddle-type vehicles having a high torque output, a relatively heavy duty actuator is required to actuate the clutch shaft. One such prior art design includes a swash plate which engages the clutch shaft. The swash plate includes an array of rollers secured thereto for riding within a corresponding array of arcuate, tapered tracks. The swash plate is coupled to the clutch cable so that as the clutch cable is drawn, the swash plate rotates and the rollers riding within the tapered tracks rise, thus axially displacing the swash plate and actuating the clutch shaft. The clutch cable is typically pivotally connected to the swash plate at a radial position thereof. Therefore, as the clutch cable is drawn, it rotates the swash plate, yet also applies a load to the swash plate in a direction of the clutch cable. This load increases friction between the swash plate and rollers, and between the rollers within the corresponding tapered tracks. This friction reduces the efficiency of the clutch actuator and adds to the manually imparted force required to actuate the clutch.

Cable drawn clutch actuators typically include a cable sheathing for covering the length of the cable, thus protecting the cable from elements and the like, and for securing distal ends of the cable to thereby provide fixed locations of the cable. However, the sheathing also generates friction as the clutch cable is drawn and released.

In summary, a user must overcome cable friction, friction associated with the clutch actuator, loads associated with clutch spring displacement and inefficiencies incorporated within the overall assembly.

In the modern age of straddle-type vehicle marketing, there is a range of consumer products including both modernistic styling and design, and traditional styling and design. Therefore, improvements or changes to operational equipment of a straddle-type vehicle may be more desirable if inconspicuous.

What is needed is a compact, efficient, non-apparent, low-cost, ergonomic manual clutch actuator assembly for a motorcycle, wherein the manual imparted force to the clutch lever in the retracted position is less than the manual force required in an intermediate position of the clutch lever, thereby reducing operator fatigue; and a method for providing the same.

SUMMARY OF THE INVENTION

An aspect of the present invention is to provide an ergonomic manual clutch actuator assembly for a straddle-type vehicle. The assembly includes a manual clutch lever pivotally mounted to a handlebar of the vehicle for actuating a clutch cable so that retraction of the clutch lever draws the clutch cable, and release of the clutch lever releases the clutch cable. A clutch actuator mechanism is provided within the housing of the vehicle proximate to a distal end of a clutch shaft extending from a clutch. The clutch actuator mechanism is driven by the clutch cable so that when the cable is drawn, the clutch actuator mechanism biases the clutch shaft and disengages the clutch, and when the cable is released, the clutch shaft returns to the engaged position. A first predefined force is required to pivot the clutch lever away from a normal extended position. A second predefined force, greater than the first force, is required to pivot the clutch lever to an intermediate position. A third predefined force is required to maintain the clutch lever in a retracted position and the third force is less than the second force to reduce operator fatigue.

Another aspect of the present invention is to provide a clutch actuator assembly having a clutch actuator mechanism including a cam pivotally mounted with respect to the vehicle, the cam being driven by the clutch cable so that the cam pivots when the cable is drawn and is released when the cable is released. The clutch actuator mechanism also includes a lever arm also pivotally mounted relative to the motorcycle. The lever arm has a first portion cooperating with the clutch shaft, and a second portion driven by the cam so that when the cam is pivoted, the lever arm biases the clutch shaft for disengaging the clutch. Also when the cam is released, the clutch shaft is released for engagement of the clutch.

A further aspect of the present invention is to provide an ergonomic manual clutch actuator by providing a clutch actuator mechanism that requires an input force that increases and subsequently decreases as the clutch is disengaged; installing the clutch actuator mechanism in a motorcycle housing, proximate to the clutch shaft such that the clutch actuator mechanism cooperates therewith; and connecting a manually operated clutch cable to the clutch actuator mechanism.

These and other advantages of the present invention will become apparent to one of ordinary skill in the art in light of the following description and attached drawings.

DETAILED DESCRIPTION OF THE PREFERRED EMBODIMENT(S)

Figure 1:
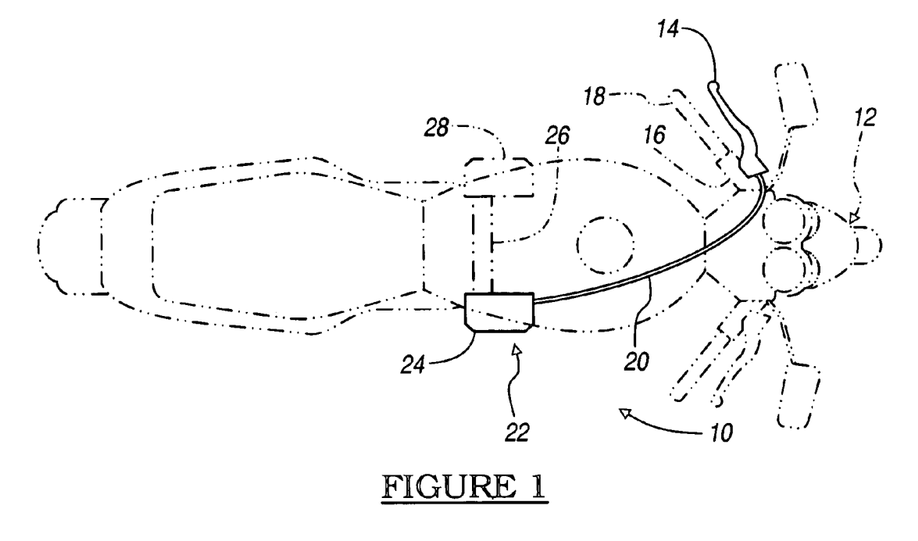
FIG. 1 is a diagrammatical top plan view of an ergonomic manual clutch actuator assembly in accordance with the present invention, the clutch actuator assembly is illustrated in cooperation with a straddle-type vehicle, particularly a motorcycle as indicated in phantom.

With reference now to FIG. 1, an ergonomic manual clutch actuator assembly is illustrated and indicated generally by reference numeral 10. The clutch actuator assembly 10 is illustrated in communication with a straddle-type vehicle, particularly a motorcycle 12 illustrated in phantom. The clutch actuator assembly 10 includes a manual clutch lever 14 pivotally mounted to a handlebar 16 of the motorcycle 12. The clutch lever 14 is oriented adjacent to a hand grip 18 at a distal end of the handlebar 16, such that a user may grip the handlebar 16 and concurrently operate the clutch actuator assembly by pivoting the clutch lever 14.

A clutch cable 20 is connected to the clutch lever 14 so that retraction of the clutch lever 14 draws the clutch cable 20 and release of the clutch lever 14 releases the clutch cable 20. A clutch actuator mechanism 22 is provided within a housing 24 of the motorcycle 12. The housing is illustrated as oriented on a lateral side of the motorcycle 12 so that the clutch actuator mechanism 22 is oriented proximate to a distal end of a clutch shaft 26. The clutch shaft 26 extends from a clutch 28. The clutch 28 may be any conventional clutch utilized to selectively couple the motor and transmission of a vehicle. Further, the clutch 28 may be a friction type clutch including a stacked array of friction plates biased in engagement by a clutch spring for maintaining the cooperation of the motor and transmission. The clutch shaft 26 cooperates with a series of clutch plates and the clutch spring so that actuation of the clutch shaft 26 overcomes the bias imparted by the clutch spring and disengages the corresponding series of clutch plates from the other series of clutch plates. In this disengaged position, no torque may be transmitted from the motor to the transmission through the clutch, thus allowing the user or an electronic control unit to select a desired gear reduction ratio of the transmission.

The clutch actuator mechanism 22 cooperates with the clutch shaft 26 to disengage the clutch 28. The clutch actuator mechanism 22 is operably connected to the clutch cable 20 so that when the cable 20 is drawn, the clutch actuator mechanism 22 biases the clutch shaft 26 and disengages the clutch 28. When the cable 20 is released, the clutch shaft 26 is released and the clutch spring causes the clutch shaft 26 to return to the engaged position, thus engaging the clutch 28.

Although the clutch cable 20 is illustrated generally in FIG. 1, it is well understood in the prior art that the cable 20 includes a mechanical cable having a fixed distal end connected to the pivotal portion of the clutch lever 14 and the opposed distal end being fixed to a portion of the clutch actuator mechanism 22. It is also understood that the clutch cable 20 is oriented within a cable sheathing, which also has fixed ends, perhaps to the non-pivotal portion of the clutch lever 14 and a non-moving portion of the clutch actuator mechanism 22 or the housing 24. These fixed, non-moving ends of the cable sheathing allow the clutch cable 20 to longitudinally translate therein as the cable 20 is drawn and released. Accordingly, a majority of the external surface area of the cable 20 may be in contact with the clutch sheathing, thus creating cable friction which must be overcome by the user in order to actuate the clutch 28.

The clutch actuator assembly 10 overall provides a transfer function of manually imparted force to the clutch lever 14 to actuate the clutch shaft 26. The transfer function is characterized wherein a first manual predefined force is required to pivot the clutch lever 14 away from a normal extended position. The normal extended position is illustrated as the free or ungripped position of the manual clutch lever 14 depicted in FIG. 1. Further, a second predefined force is required to further pivot the clutch lever 14 to an intermediate position, the second force being greater than the first force. The second intermediate position is a position between the normally extended position and a fully retractive position, possibly corresponding with a peak force required to actuate the clutch shaft 26. A third predefined force is required to maintain the clutch lever 14 in the retracted position, the third force being less than the second force. This transfer function reduces operator fatigue by allowing the operator to keep the clutch 28 disengaged by gripping the clutch lever 14 in the fully retracted position and maintaining this orientation of the clutch lever 14 for a period of time without having to continuously impart a manual force that corresponds with the maximum required force to actuate the clutch shaft 26. In other words, the force required to maintain the clutch 28 in a disengaged position drops off or reduces in the retracted position so that the user may maintain the disengagement of the clutch 28 with reduced effort.

Figure 2:
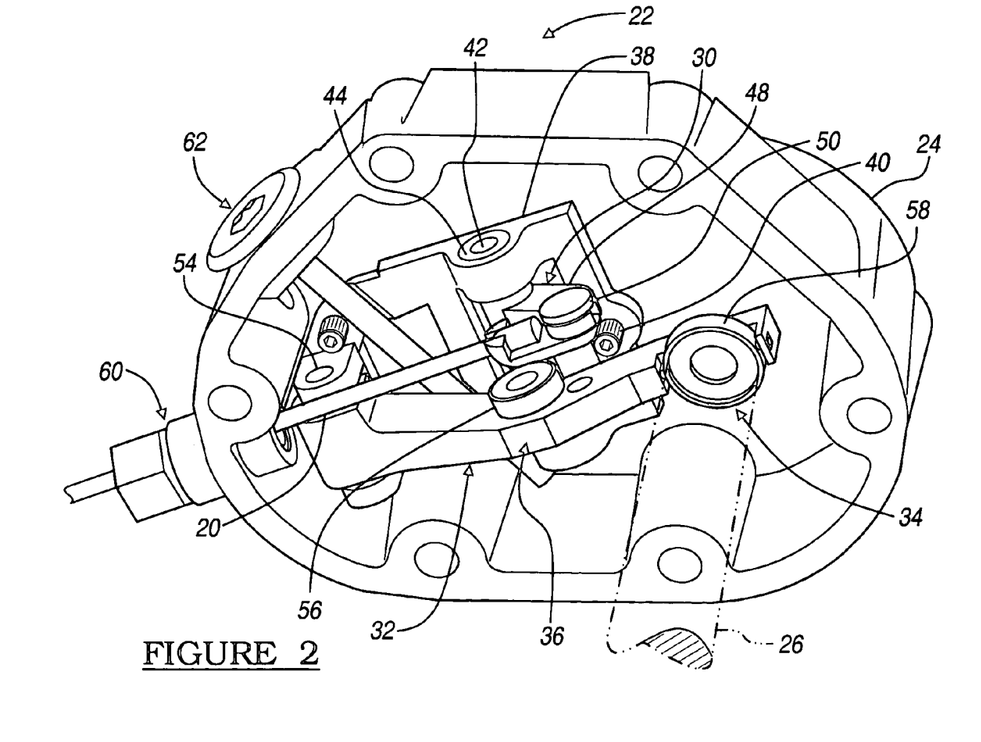
FIG. 2 is a side perspective view of a preferred embodiment clutch actuator mechanism.
Figure 3:
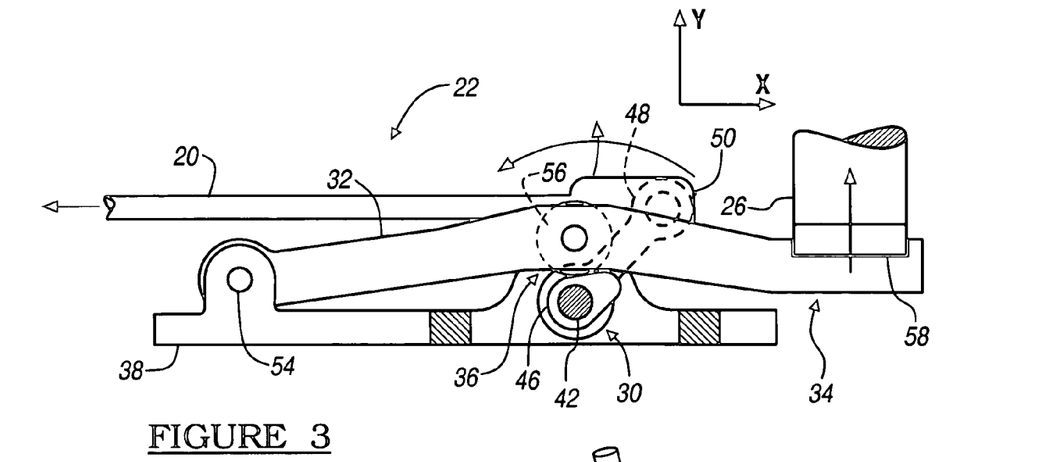
FIG. 3 is a bottom plan view of the clutch actuator mechanism of FIG. 2.
Figure 4:
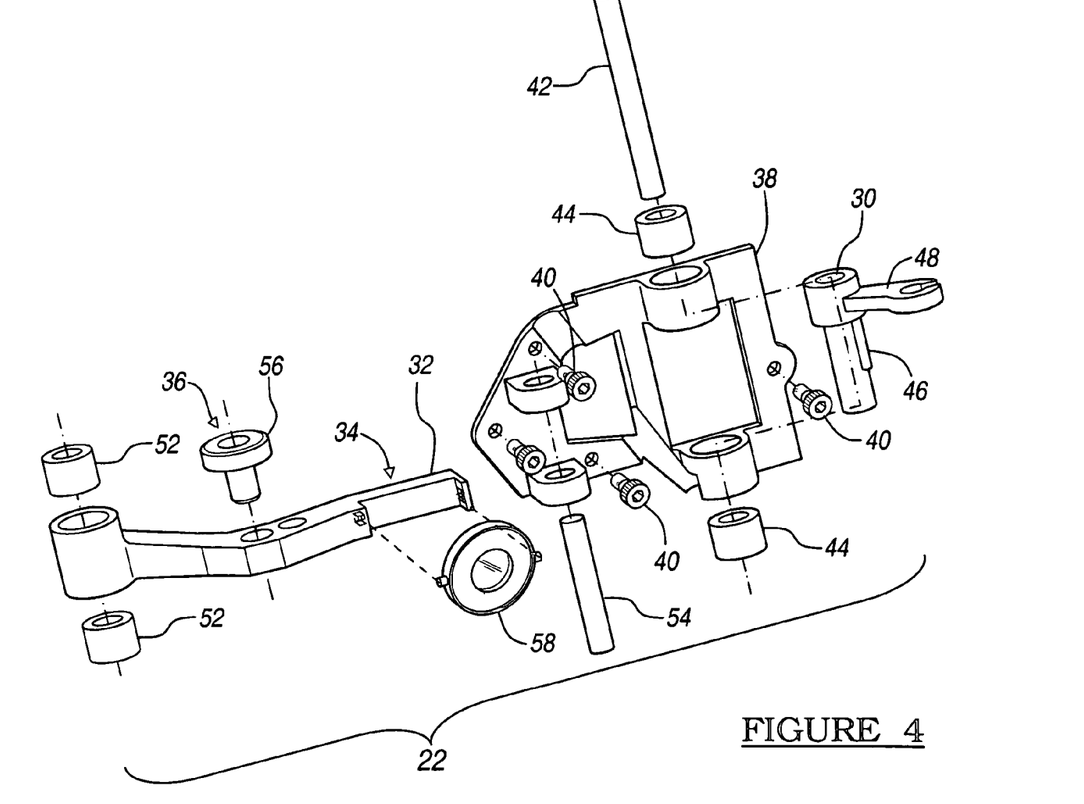
FIG. 4 is an exploded side perspective view of the clutch actuator mechanism of FIG. 2.

Referring now to FIGS. 2–4, the preferred embodiment clutch actuator mechanism 22 is illustrated in further detail. The clutch actuator mechanism 22 is oriented within the housing 24 as illustrated in FIG. 2. This orientation of the clutch actuator mechanism 22 allows for a compact design, which may be oriented proximate to the clutch shaft 26, and may dispose the clutch actuator mechanism 22 in an inconspicuous location unseen and non-interrupting to the aesthetic design of the motorcycle 12. Further, this orientation of the clutch actuator mechanism 22 offers a non-apparent mechanical advantage to the user, which may be desired for consumers of traditional straddle-type vehicles. The housing 24 may also have a similar or same external appearance as that of a prior art housing for prior art clutch actuator mechanisms. For example, the housing 24 illustrated in FIG. 2 may have the same external aesthetic appearance as that of a prior art housing for retaining a prior art swash plate clutch actuator mechanism, typical in high torque straddle-type vehicles.

The clutch actuator mechanism 22 includes a cam referenced generally by numeral 30, and a lever arm referenced generally by numeral 32. The cam 30 and lever arm 32 are each pivotally mounted within the housing 24 for rotational displacement relative to the motorcycle 12. The cam 30 is connected to the clutch cable 20 so that the cam 30 pivots when the cable 20 is drawn and the cam 30 is released when the cable 20 is released. The lever arm 32 has a first portion 34 cooperating with the clutch shaft 26, and a second portion 36 driven by the cam 30 so that when the cam 30 is pivoted, the lever arm 32 biases the clutch shaft 26 and disengages the clutch 28. When the cam 30 is released, the clutch shaft 26 returns due to the clutch spring consequently re-engaging the clutch 28. The cam 30 of the preferred embodiment has a range of rotation of approximately eighty degrees. For comparison, a prior art swash plate utilized for a similar clutch actuator application rotates about twenty-eight to thirty-two degrees. The prior art and preferred embodiment clutch actuator mechanisms are employed to displace the clutch shaft 26 by 0.090 inches.

The clutch actuator mechanism 22 includes a mounting bracket 38 for mounting the clutch actuator mechanism 22 within the housing 24 by a plurality of fasteners 40. The cam 30 receives a pin 42 axially therethrough, and the pin 42 is pivotally secured to the mounting bracket 38 by a pair of bearings 44. The cam 30 includes a cam surface 46 and a radially extending cam lever 48. The cam 30 of the preferred embodiment is formed from a sintered metal process. The distal end of the cam lever 48 is coupled to the clutch cable 20 by a pivotal cable coupling 50. The cam surface 46 cooperates with the lever arm second portion 36 such that reciprocal motion of the clutch cable 22 pivots the cam 30 and the cam surface 46 converts the pivotal motion of the cam 30 into reciprocal motion through the engagement with the lever arm 32.

Similarly, the lever arm 32 includes a pair of bearings 52 for pivotal support about a pin 54 that is secured to the mounting bracket 38 generally parallel to the pivotal axis of the cam 30. The lever arm second portion 36 includes a cam follower 56 pivotally affixed thereto for cooperating with the cam surface 46. The lever arm first portion 34 includes a rocker washer 58 pivotally connected thereto for cooperating with the clutch shaft 26. The rocker washer 58 is pivotal about an axis perpendicular to the clutch shaft 26 and perpendicular to an axis about which the lever arm 32 pivots. The rocker washer 58 is further axially translatable along the axis about which it pivots. The pivotal and sliding relationship of the rocker washer 58 relative to the lever arm 32 allows the rocker washer 58 to securingly engage the distal end of the clutch shaft 26 throughout the actuation thereof. The flexibility of the rocker washer 58 orientation ensures that the load applied to clutch shaft 26 is evenly distributed.

Due to the bearing support provided to the cam 30 by bearings 44, to the lever arm 32 by bearings 52, to the engagement between the cam 30 and lever arm 32 through the cam follower 56, and to the lever arm 32 and clutch shaft 26 by the rocker washer 58, friction is generally overall reduced in the clutch actuator mechanism 22 in comparison to prior art clutch actuator mechanisms. Therefore, the force received by the clutch actuator mechanism from the clutch cable 20 is converted into actuation efficiently without much loss due to friction as with a prior art clutch actuator mechanism such as the swash plate design.

Referring now to FIG. 2, the housing 24 includes a cable inlet port 60 to which a distal end of the cable sheathing is externally secured, and through which the cable 20 extends. Further, as in conventional prior art clutch actuator mechanism housings for high torque output straddle-type vehicles, the housing 24 also includes an inlet port 62 for an oil level indication member to pass therethough. The clutch actuator mechanism provides clearance for the oil level indication member. Although the inside of the housing has varying mounting features in comparison to a prior art housing, the external aesthetic appearance of the housing is dimensionally identical and is consistent by providing similar or same orientations of the oil level inlet port 62 and the cable inlet port 60. Further, the mounting face and hole pattern of the housing 24 is identical to a prior art housing. Therefore, the present invention contemplates utilization on both new vehicles and as a retro fit on older straddle-type vehicles. Accordingly, a straddle type vehicle user may interchange a prior art clutch actuator mechanism and housing with the present invention to experience the benefits afforded thereby. Further, the invention contemplates clutch actuator mechanisms and clutch actuator assemblies within the spirit and scope of the present invention, that are designed for a plurality of new or modern straddle-type vehicles and old or traditional style straddle-type vehicles.

Figure 5:
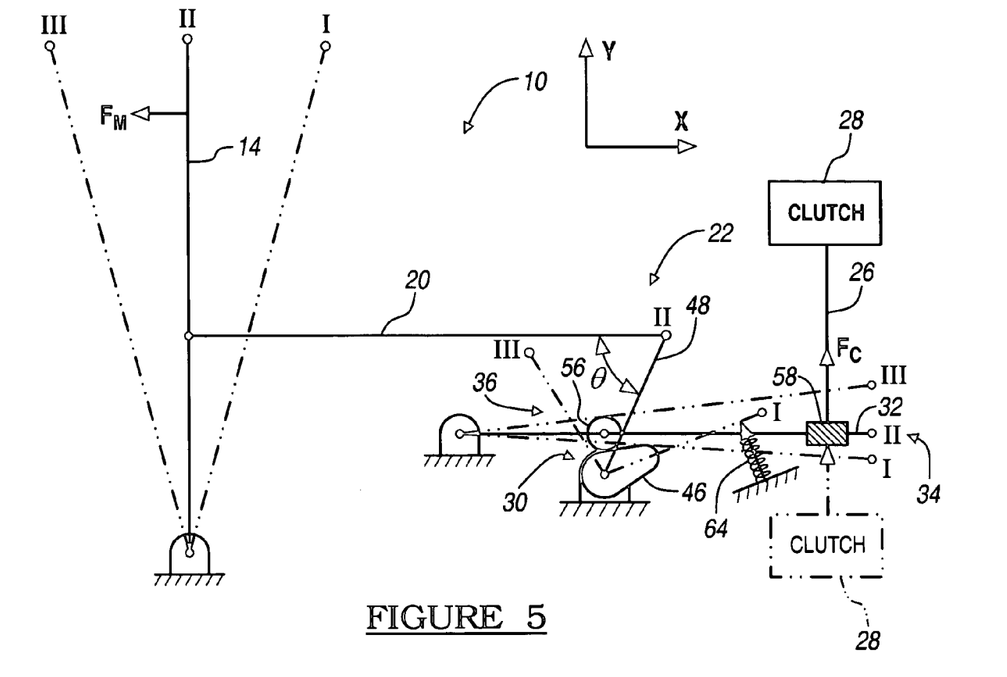
FIG. 5 is a schematic view of the ergonomic manual clutch actuator assembly in accordance with the present invention.

The operational characteristics of the present invention will now be described with reference to FIGS. 2–5. FIG. 5 is a schematic representation of the preferred embodiment clutch actuator mechanism 22 as illustrated with detail in FIGS. 2–4. Initially, a user imparts a force to the clutch lever 14. This force is indicated by $F_M$ in FIG. 5. Also, the clutch lever 14 is illustrated in the intermediate position labeled by reference numeral II. The normal extended position of the clutch lever 14 is illustrated in phantom and labeled by reference numeral I, and the retracted position is illustrated in phantom and labeled by reference numeral III. The manual clutch lever 14 provides a slight mechanical advantage to the manually imparted force $F_M$ by magnifying the load applied to the cable 20. As illustrated in the schematical illustration of FIG. 5, the manual clutch lever 14 applies a simple linear magnification assuming that the manually imparted force and the cable 20 maintain constant vectors relative to the handlebar 16. For instance, in FIG. 5 assuming the force imparted in the y-direction is negligible and the load upon the cable in the y-direction is negligible, then the mechanical advantage provided by the clutch lever 14 is a linear function, such as a simple lever provides. Also, if the manually imparted force and/or the clutch cable 20 are not applied in a consistent directional manner, then the mechanical advantage provided by the lever 14 may be a function of these relationships. Manual clutch levers such as the one referenced by numeral 14 are common and well known in the art and the invention contemplates utilization of any such manual clutch lever 14 regardless of the particular mechanical advantage provided therefrom.

The load applied to the clutch cable 20 is a tensile load applied across the cable 20. Due to the elasticity of the clutch cable 20, some of the displacement provided by the manual clutch lever 14 is utilized in a change in length of the cable 20. Depending on the diameter and length of the clutch cable 20, and the material, the elasticity may be deemed negligible. Due to the external surface area and texture of the cable 20 and the associated coefficient of friction, in combination with the coefficient of friction of the cable sheathing, some of the load applied to the cable 20 is employed in overcoming a static force of friction upon the cable 20, and subsequently a kinetic force of friction. The remaining tensile load, after friction, is imparted to the cam lever 48.

The clutch cable 20 applies a load to the cam lever 48 thus pivoting the cam lever 48 between the first and third positions. Due to the cam lever 48 being a radial extension from its axis of rotation, and the clutch cable 20 having a generally constant vector, as best illustrated in FIG. 3, the mechanical advantage provided to the cam 30 is a function of the cosine of the angle between the cam lever 48 and the clutch cable 20. Accordingly, the angular displacement of the cam 30 rapidly increases between positions I and II relative to the linear displacement of the clutch cable 20, due to the relatively narrow angle θ between the cam lever 48 and the clutch cable 20. Between positions II and III, angle θ is relatively broad, thus providing a decreasing change in angular position relative to the linear displacement of the clutch cable 20. Thus, a steady change in pivotal orientation of the clutch lever 14 results in a rapid increase in angular displacement of the cam 30 and rapid linear displacement of the clutch shaft 26 between positions I and II; and subsequently, the linear displacement of the clutch lever 14 in the range of positions II to III, results in a steady linear displacement of the clutch cable 20 and an almost steady angular displacement of the cam 30 and almost steady angular displacement of the clutch shaft 28 between positions II and III.

If a cam surface 46 is utilized that is linearly increasing in cam displacement, displacement of the clutch shaft 26 would be a direct function of the cosine of the angular displacement of the cam 30. Due to this relationship, a generally increasing force would be required from the user between position I and II and then a generally decreasing force would be required between positions II and III. For example, the preferred embodiment would require seventy percent less force at the retracted position III of that required at the peak manual imparted force at or near position II of the manual clutch lever 14.

Concomitantly, a mechanical advantage may be acquired due to the profile of the cam surface 46. For example, the cam surface 46 may have a steep slope between position I and II, and subsequently have a relatively shallow slope between positions II and III of the cam 30.

Figure 5A:
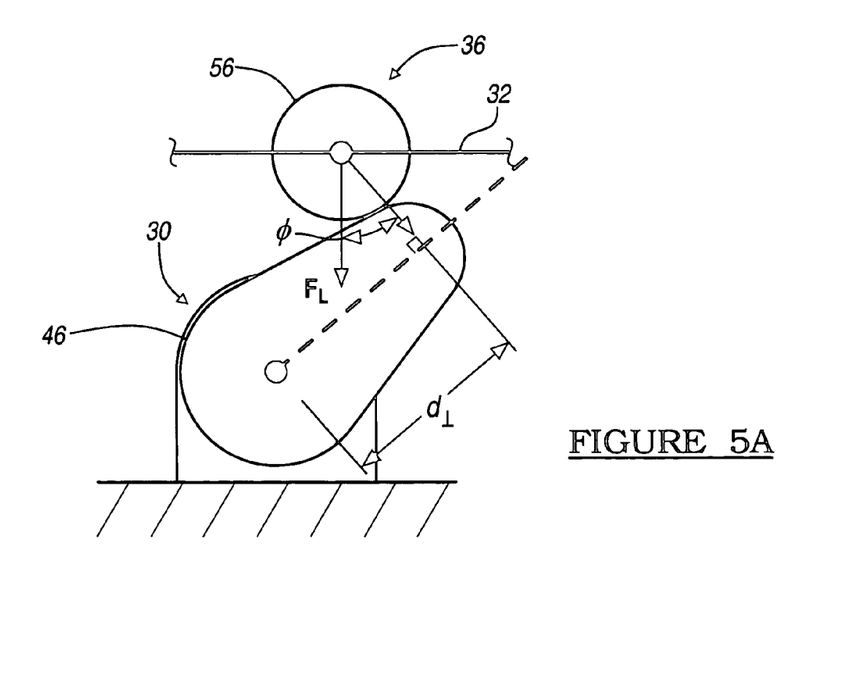
FIG. 5a is an enlarged schematic view of a cam and a cam follower of FIG. 5.

Referring now to FIG. 5a, the relationship between the cam 30 and the cam follower 56 is illustrated in further detail. As discussed earlier, the clutch shaft 26 imparts a force $F_C$ from the clutch spring to the lever arm first portion 34. Consequently, a corresponding force is imparted from the lever arm second portion 36 to the cam 30. More particularly, the force referenced by $F_L$ is imparted from the cam follower 56 to the cam surface 46. The force $F_L$ imparts a torque to the cam 30. This torque can be determined by the equation:

$$T_C = F_L \cdot d\perp \cdot \cos(\varphi);\qquad \text{(Equation 1)}$$

wherein $T_C$ is the torque imparted upon the cam 30, $F_L$ is the force imparted from the cam follower 56, $d\perp$ is the normal distance between the pivotal axis of the cam 30 and the normal direction of contact between the cam follower 56 and the cam 30, and $\varphi$ is the pressure angle. The pressure angle $\varphi$ is defined as the angle between the force imparted from the cam follower 56 and the normal direction of a contact between the cam follower 56 and the cam surface 46.

It is understood by one having ordinary skill in the art that the torque imparted upon the cam 30 can be substantially decreased by minimizing the normal $d\perp$ distance between the cam pivot and the normal direction of the contact between the cam surface 46 and cam follower 56. Therefore, a cam profile may be selected that minimizes the value of this distance $d\perp$ as the force imparted thereto increases. As the clutch shaft 26 is actuated to the disengaged position III, the clutch spring experiences a maximum displacement and therefore exerts a maximum force. Accordingly, the cam profile is designed such that a relatively low slope of the cam surface 46 contacts the cam follower 56 at the disengaged position III, such that a dimension $d\perp$ has a minimum value, thus minimizing the torque on the cam 30. Therefore, at the maximum force orientation of the clutch shaft 26 the torque applied to the cam is less than the maximum torque applied to the cam. Consequently the force required by the user at position III of the clutch lever 14 is less than the force required at position II of the clutch lever 14.

The preferred embodiment clutch actuator mechanism 22 represents a plurality of balances between compactness, displacement, loading, and friction in order to provide a compact clutch actuator mechanism 22 that may be oriented within the housing 24 to provide the transfer function necessary between the manual imparted force to disengage the clutch. The invention contemplates that various components of the clutch actuator assembly 10 may be adjustable or interchangeable in order to provide a transfer function desirable for a particular user. Various transfer functions may be desired depending upon strength of the user, or hand size.

Figure 6:
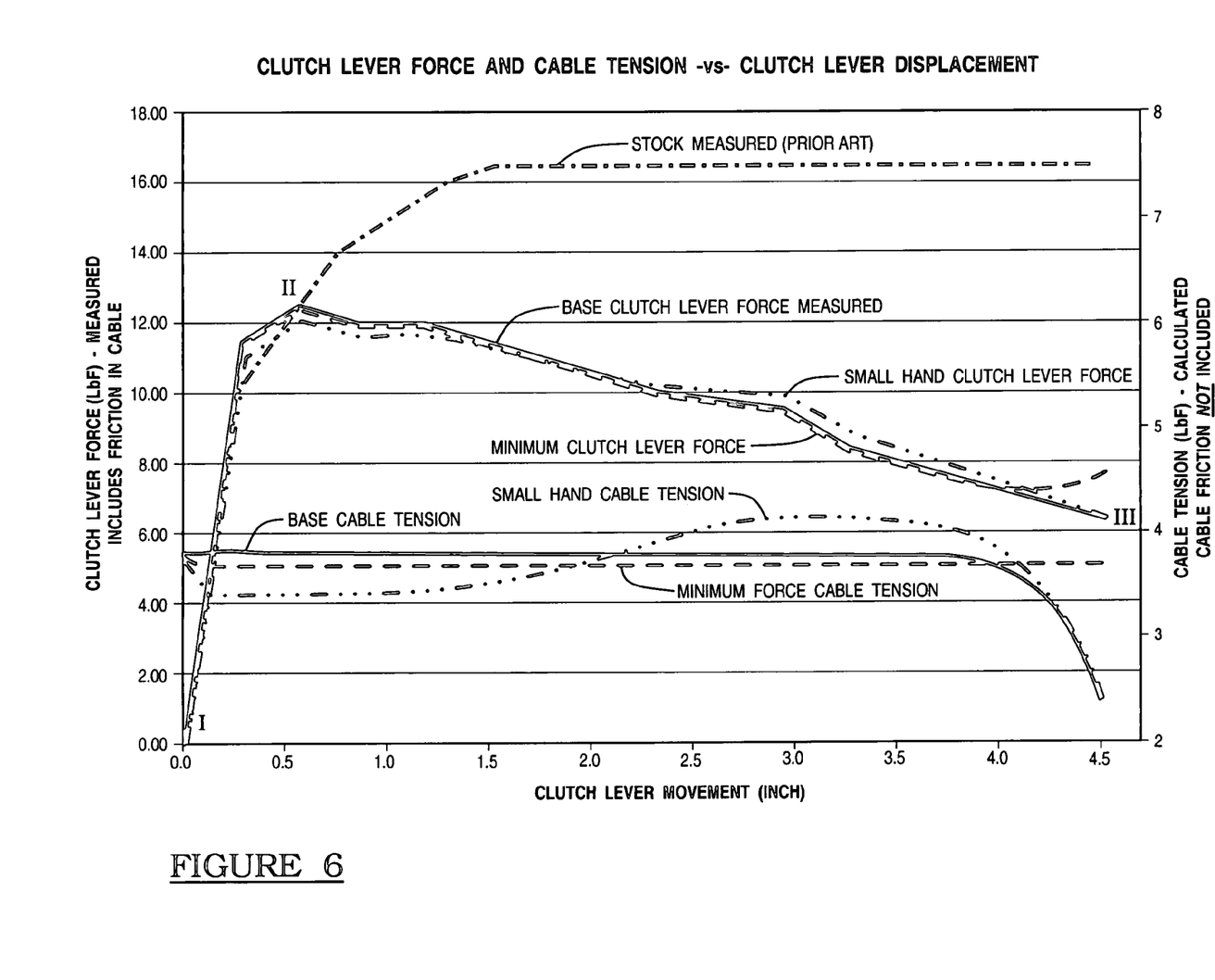
FIG. 6 is a graph of manual clutch lever force and calculated cable tension versus clutch lever displacement for an ergonomic manual clutch actuator assembly in accordance with the present invention.

Referring now to FIG. 6, calculated cable tension is graphed versus clutch lever displacement in inches for various cam profiles. This relationship is illustrated at the lower region of the graph and corresponds with the ordinate scale labeled 'cable tension'. The tension in the clutch cable 20 is calculated in pound force and cable friction is not included in this calculation. Further, lever movement is determined as linear displacement of a point on the clutch lever 14 that is central to the location of an average user's grip. For the 'base' profile of the cam surface, the calculated tension generally remains constant as the clutch spring is depressed, and consequently the tension is reduced at the full retraction of the clutch lever 14. For a 'small hand' profile, an alternative cam profile variant may be utilized such that the tension in the clutch cable 20 generally and steadily increases and then rapidly decreases. A 'minimum force' cam profile may also be utilized for an overall steady calculated tension within the cable.

The measured clutch lever force required to disengage the clutch is graphed and illustrated relative to the cam profiles versus calculated cable tension. This relationship is illustrated at the upper region of the graph and corresponds with the ordinate scale labeled 'clutch lever force'. A 'stock measured' straddle-type vehicle utilizing a prior art clutch actuator mechanism is graphed illustrating a generally increasing imparted manual force that becomes generally constant in an intermediate position II of the clutch lever and remains constant until the retracted position III of the clutch lever, thus requiring the user to maintain the maximum or peak imparted manual force in order to maintain the disengagement of the clutch. The 'base measured' illustrates the manual imparted force required to actuate the clutch lever utilizing the base cam profile as derived from empirical data. As the user applies a generally increasing manual force, the clutch lever 14 begins to pivot from the extended position I, overcoming the static force of friction applied on the clutch cable 20 and the associated clutch actuator components. Subsequently, as the cam 30 is continuously angularly displaced and the clutch shaft 26 is continuously linearly displaced, the required manually imparted force increases at the intermediate region II and generally decreases to approximately six and a half pounds of force at the fully retracted position III. The maximum or peak force required to actuate is approximately four pounds of force less than the comparable prior art design.

The clutch lever force may be predicted for various cam profiles. This may be accomplished by first determining the difference of cable tension in a desired cam profile and the base cam profile, and adding this difference to the base measured clutch lever force. For example, the predicted clutch lever force is graphed for both the small hand profile and a minimum force profile. One having ordinary skill in the art can appreciate the flexibility provided by the present invention for customizing a clutch actuator assembly 10 for a particular user. Varying cable tension profiles can be derived from cam profile variants and the resultant transfer function, as a function of clutch lever force required by the user can be determined.

As illustrated, the "small hand" cam profile provides a clutch lever force function that has a peak less than that of the base profile in the intermediate position II, however requires a generally greater force than that of the base as approaching the retracted position III. For the "minimum clutch lever force" profile, a manually imparted force is required that is less than that of the base profile at the intermediate position II and approaching the retracted position III. However, the minimum force profile results in a manually imparted force at the fully retracted position III that is greater than that required of the base profile.

At the fully retracted position III of the lever 14, at approximately four and a half inches of clutch lever 14 displacement, a manual force that is almost less than fifty percent of the peak force is required for the base profile. It is desired that the retracted force be less than seventy percent of the peak force. It is also desired that the manually imparted force does not overly diminish in the retracted position III of the clutch lever 14. Otherwise, the mechanical advantage provided to the user, if excessive, could result in a mechanical disadvantage to the clutch spring, wherein the clutch spring may not be able to overcome the associated forces of friction in the assembly to return the clutch 28 to the engaged position. However, if desired by a user, such an assembly is contemplated within the scope of the present invention, yet would require the user to impart a manual force on the clutch lever 14 from the retracted position III to the free extended position I to overcome the static force of friction until the clutch spring could complete the release of the clutch cable 20 and manual clutch lever 14.

It may also be desired to have a cam design with a continuous rise interval through its range of travel within the assembly. If the cam 30 were to have a dwell region with no slope, the clutch may not be able to reengage upon release of a manual imparted force to the clutch lever 14 because the cam 30 may not return to the free extended position I. Similarly, the cam 30 does not travel over the peak of the cam surface 46, resulting in a decrease in slope of the cam surface 46, because the clutch spring would thus bias the cam 30 to continue in this direction away from the free extended position I of the clutch lever 14.

The invention contemplates that many of the components within the clutch actuator assembly may be adjustable by providing various connections for the associated in a related component or interchangeable components may be provided. For example, the lever arm 32 may include various pivot mounting locations to allow the user to manipulate the leverage provided thereby. Alternatively, various lever arms may be provided such that a desired leverage may be chosen by utilizing the preferred lever arm. Additionally, a cam 30 may be provided with various mounting positions of the cable coupling 50 such that a user may manipulate the relationships between the cable displacement and cam displacement.

Referring again to FIG. 5, a compression spring 64 is illustrated in cooperation with the cam lever 48 at the free extended position I. The compression spring 64 applies a force to the cam lever 48 for assisting the user in overcoming the initial static force of friction associated with the clutch actuator assembly 10, and the initial force $F_C$ to actuate the clutch 28.

As illustrated in the preferred embodiment clutch actuator assembly 10, the housing 24 is oriented on a first lateral side of the motorcycle 12 such that the clutch actuator mechanism 22 biases the distal end of the clutch shaft 26 away from the first lateral side of the motorcycle 12, when the cable 20 is drawn. Alternatively, the invention contemplates that the clutch actuator mechanism 22 may be utilized to bias a distal end of a clutch shaft 26 towards the first lateral side of the motorcycle 12, when the cable is drawn. This relationship is illustrated in phantom is FIG. 5. Accordingly, the present invention may be utilized to either push or pull a clutch shaft, thus providing a clutch actuator mechanism that may be utilized with various clutches or may be provided on either side of the motorcycle 12.

In summary, the preferred embodiment provides both an ergonomic manually actuated clutch actuator and a method for providing the same. The method provides the clutch actuator mechanism 22, which requires an input force that increases and subsequently decreases as the clutch shaft 26 is biased by the clutch actuator mechanism 22 from the engaged position I to the disengaged position III. The clutch actuator mechanism 22 is installed within the motorcycle housing 24, proximate to the clutch shaft 26 such that the clutch actuator mechanism 22 cooperates therewith. The manually operated clutch cable 20 is connected to the clutch actuator mechanism, thus allowing the user to enjoy an ergonomic and effective clutch actuator mechanism in view of the prior art. Additionally, the method includes sizing the clutch actuator mechanism 22 to predetermined input force requirements in clutch shaft displacement.

Figure 7:
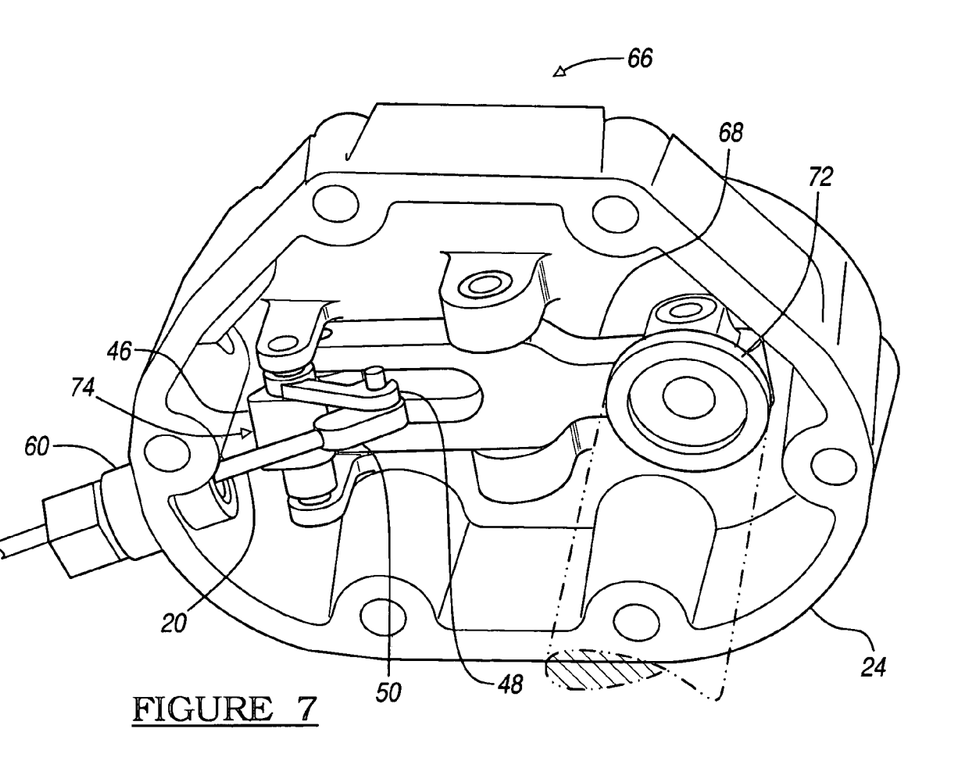
FIG. 7 is a side perspective view of an alternative embodiment clutch actuator mechanism in accordance with the present invention.
Figure 8:
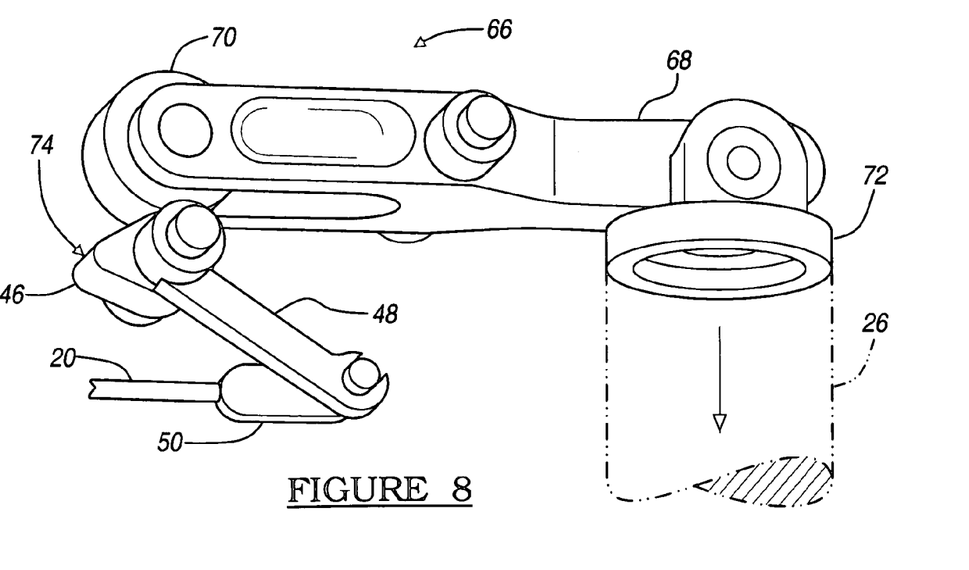
FIG. 8 is a top plan view of the clutch actuator mechanism of FIG. 8.

Referring now to FIGS. 7 and 8, an alternative embodiment clutch actuator mechanism 66 is illustrated having a centrally pivoted lever arm 68. The lever arm 68 includes a cam follower 70 and a rocker washer 72 each pivotally mounted on opposites sides thereof with the pivotal axis of the lever arm 68 oriented therebetween. Unlike the preferred embodiment, the clutch actuator mechanism 66 includes a cam 74 located proximate to the cable inlet port 60. Unlike the preferred embodiment, the cam follower 70 is provided with an improved mechanical advantage relative to the rocker washer 72 because the pivot of the lever arm 68 is central therebetween, thus requiring less force $F_L$ from the lever arm 68 to overcome the force $F_C$ from the clutch shaft 26. In comparison, the preferred embodiment has a distance from the rocker washer 58 to the lever arm 32 pivot axis that is approximately twice the distance between the cam follower 56 and associated pivot location of the lever arm 68. However, this mechanical advantage requires a much steeper cam profile in order to displace the rocker washer 72 appropriately. Accordingly, the alternative embodiment clutch actuator mechanism 66 illustrates various tradeoffs between clutch cable 20 displacement and clutch shaft 26 displacement due to variations of the cam 74 and lever arm 68 design.

In summary, the present invention provides a compact and low cost clutch actuator mechanism that reduces the required amount of manual imparted force as the clutch is disengaged to thereby reduce operator fatigue.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An ergonomic manual clutch actuator assembly for a straddle-type vehicle, the clutch actuator assembly comprising:
   a manual clutch lever pivotally mounted to a handlebar of a straddle-type vehicle adjacent to a hand grip;
   a clutch cable connected to the clutch lever so that retraction of the clutch lever draws the clutch cable, and release of the clutch lever releases the clutch cable; and
   a clutch actuator mechanism provided within a housing of the straddle-type vehicle proximate to a distal end of a clutch shaft extending from a clutch, the clutch actuator mechanism cooperating with the clutch shaft and being operably connected to the clutch cable so that when the cable is drawn, the clutch actuator mechanism biases the clutch shaft and disengages the clutch, and when the cable is released, the clutch shaft is released to engage the clutch;
   wherein a first predefined force is required to pivot the clutch lever away from a normal extended position, a second predefined force is required to further pivot the clutch lever to an intermediate position, the second force being greater than the first force, and a third predefined force is required to maintain the clutch lever in a retracted position, the third force being less than the second force, thereby reducing operator fatigue; and
   wherein the third force is less than the first force.

2. The clutch actuator assembly of claim 1, wherein the third force is less than seventy percent of the second force.

3. The clutch actuator assembly of claim 1, wherein the second force is less than thirteen pounds of force.

4. The clutch actuator assembly of claim 1, wherein the third force is less than eight pounds of force.

5. The clutch actuator assembly of claim 1, wherein the housing includes an inlet port for an oil level indication member to pass therethrough.

6. The clutch actuator assembly of claim 1, wherein the housing is oriented on a first lateral side of the straddle-type vehicle and the clutch actuator mechanism biases the distal end of the clutch shaft away from the first lateral side of the straddle-type vehicle, when the cable is drawn.

7. The clutch actuator assembly of claim 1, wherein the housing is oriented on a first lateral side of the straddle-type vehicle and the clutch actuator mechanism biases the distal end of the clutch shaft towards the first lateral side of the straddle-type vehicle, when the cable is drawn.

8. An ergonomic manual clutch actuator assembly for a straddle-type vehicle, the clutch actuator assembly comprising:
   a manual clutch lever pivotally mounted to a handlebar of a straddle-type vehicle adjacent to a hand grip;
   a clutch cable connected to the clutch lever so that retraction of the clutch lever draws the clutch cable, and release of the clutch lever releases the clutch cable; and
   a clutch actuator mechanism provided within a housing of the straddle-type vehicle proximate to a distal end of a clutch shaft extending from a clutch, the clutch actuator mechanism cooperating with the clutch shaft and being operably connected to the clutch cable so that when the cable is drawn, the clutch actuator mechanism biases the clutch shaft and disengages the clutch, and when the cable is released, the clutch shaft is released to engage the clutch;
   wherein a first predefined force is required to pivot the clutch lever away from a normal extended position, a second predefined force is required to further pivot the clutch lever to an intermediate position, the second force being greater than the first force, and a third predefined force is required to maintain the clutch lever in a retracted position, the third force being less than the second force, thereby reducing operator fatigue; and
   wherein the clutch actuator mechanism is further defined as:
   a cam pivotally mounted within the housing, the cam being connected to the clutch cable so that the cam pivots when the cable is drawn and the cam is released when the cable is released, and a lever arm pivotally mounted within the housing, the lever arm having a first portion cooperating with the clutch shaft and a second portion driven by the cam so that when the cam is pivoted, the lever arm biases the clutch shaft and disengages the clutch, and when the cam is released, the clutch shaft returns and engages the clutch.

9. An ergonomic manual clutch actuator assembly for a straddle-type vehicle, the clutch actuator assembly comprising:
- a manual clutch lever pivotally mounted to a handlebar of a straddle-type vehicle adjacent to a handgrip;
- a clutch cable connected to the clutch lever so that retraction of the clutch lever draws the clutch cable, and release of the clutch lever releases the clutch cable;
- a cam pivotally mounted to the straddle-type vehicle, the cam being connected to the clutch cable so that the cam pivots when the cable is drawn and is released when the cable is released; and
- a lever arm pivotally mounted to the straddle-type vehicle, the lever arm having a first portion cooperating with a clutch shaft extending from a clutch, and a second portion driven by the cam so that when the cam is pivoted, the lever arm biases the clutch shaft and disengages the clutch, and when the cam is released, the clutch shaft is released to engage the clutch;
- wherein the cam and lever arm cooperate so that a first predefined force is required to pivot the clutch lever away from a normal extended position, a second predefined force is required to further pivot the clutch lever to an intermediate position, the second force being greater than the first force, and a third predefined force is required to maintain the clutch lever in a retracted position, the third force being less than the second force, thereby reducing operator fatigue.

10. The clutch actuator assembly of claim 9, wherein the third force is less than the first force.

11. The clutch actuator assembly of claim 9, wherein the third force is less than seventy percent of the second force.

12. The clutch actuator assembly of claim 9, wherein the cam and lever arm are sized for a predetermined function of input force required and displacement of the clutch shaft.

13. The clutch actuator assembly of claim 9, wherein the cam is provided with bearing support relative to the straddle-type vehicle for reducing friction in the clutch actuator.

14. The clutch actuator assembly of claim 9, wherein the lever arm is provided with bearing support relative to the straddle-type vehicle for reducing friction in the clutch actuator.

15. The clutch actuator assembly of claim 9, further comprising a rocker washer pivotally connected to the lever arm first portion for cooperating with the clutch shaft.

16. The clutch actuator assembly of claim 9, wherein the cam has a continuous rise interval.

17. The clutch actuator assembly of claim 9, further comprising a cam follower mounted to the lever arm second portion and rotatably engaging the cam for reducing friction within the clutch actuator.

18. The clutch actuator assembly of claim 9, further comprising a lever coupled for rotation with the cam, the lever having a distal end adapted to connect the clutch cable thereto.

19. The clutch actuator assembly of claim 18, wherein the cam lever is sized for a predetermined function of input force required and displacement of the clutch shaft.

20. The clutch actuator assembly of claim 18, further comprising a spring for applying a force to the cam in a pivotal direction defined from a peak displacement portion of the cam towards the second portion of the lever arm.

21. The clutch actuator assembly of claim 9, further comprising a housing mounted on the straddle-type vehicle proximate to a distal end of the clutch shaft, for enclosing the cam and lever arm.

22. The clutch actuator assembly of claim 21, wherein the cam and lever arm are pivotally mounted within the housing.

23. The clutch actuator assembly of claim 21, wherein the housing includes a passage for an oil level indication member to pass therethrough.

* * * * *